United States Patent [19]

Weinberger

[11] Patent Number: 4,958,065

[45] Date of Patent: Sep. 18, 1990

[54] METHOD AND APPARATUS FOR CODING HEAT SENSITIVE MEDIA

[75] Inventor: Zvi Weinberger, Jerusalem, Israel

[73] Assignee: Prepaid Card Services, Inc., Pearl River, N.Y.

[21] Appl. No.: 227,468

[22] Filed: Aug. 1, 1988

Related U.S. Application Data

[63] Continuation of Ser. No. 773,801, Sep. 9, 1985, abandoned.

[30] Foreign Application Priority Data

Sep. 14, 1984 [IL] Israel ............................ 72951

[51] Int. Cl.⁵ ............................................ G06K 7/10
[52] U.S. Cl. .................................. 235/455; 235/487; 235/488; 346/76 R; 350/353; 430/336
[58] Field of Search ............... 235/488, 455, 469, 487

[56] References Cited

U.S. PATENT DOCUMENTS

| | | | |
|---|---|---|---|
| 3,584,934 | 6/1971 | French ..................... | 350/353 |
| 3,836,754 | 9/1974 | Toye et al. ................ | 235/469 X |
| 4,246,302 | 1/1981 | Benton et al. ............. | 350/351 X |
| 4,273,362 | 6/1981 | Carrier et al. ............ | 283/102 X |
| 4,332,872 | 6/1982 | Zingher .................... | 350/353 X |
| 4,505,498 | 3/1985 | Weinberger ............... | 235/488 X |

Primary Examiner—David L. Trafton
Attorney, Agent, or Firm—Kenyon & Kenyon

[57] ABSTRACT

A method of coding an optically-readable medium comprises: applying to the medium at least one coating of a heat-sensitive material to produce a specified combination of at least two optical changes as a function of time when heated to a predetermined temperature above ambient; heating the medium to the predetermined temperature; and sensing the optical changes undergone by the medium to determine whether the sensed changes match the specified combination. The method and apparatus are described particularly to an optically-readable medium wherein the heat-sensitive coating is in a plurality of windows formed in the medium, each window signifying a value element.

24 Claims, 2 Drawing Sheets

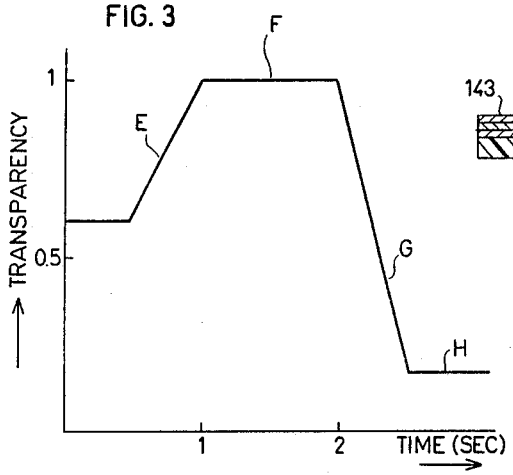
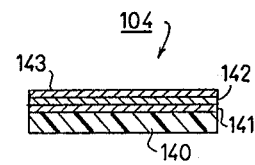
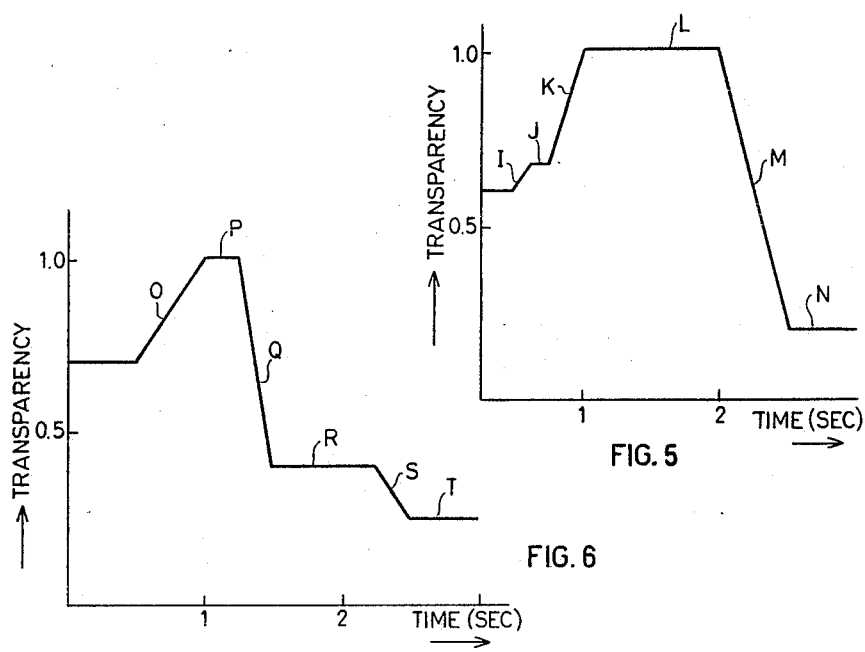
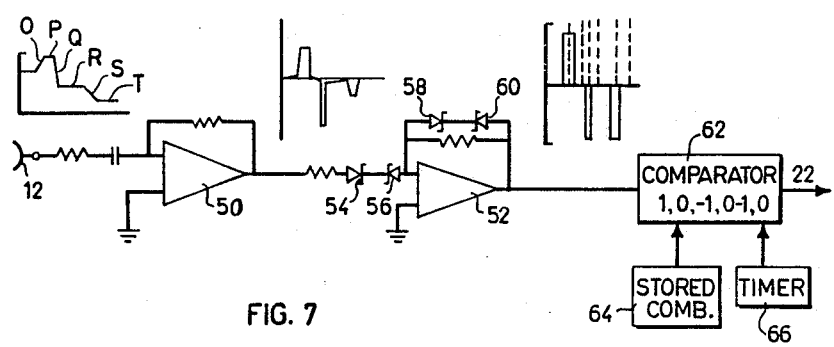

METHOD AND APPARATUS FOR CODING HEAT SENSITIVE MEDIA

This application is a continuation-in-part of application Ser. No. 773,801, filed Sept. 9, 1985, now abandoned.

BACKGROUND OF THE INVENTION

The present invention relates to a method and apparatus for coding heat-sensitive optically-readable media. The invention is particularly applicable to optically-readable value cards formed with a plurality of windows each representing a value element for use in vending systems, such as described in our U.S. Pat. No. 4,505,498.

As described in the above-cited patent specification, there are many consumer goods and services which are conveniently purchased directly by the consumer using coins or special tokens. Examples of such services are telephone calls, parking space for vehicles, subway or bus fares, locker rentals, and in some countries, the gas utility; examples of goods are vending machine articles, such as newspapers, food products and the like. However, the ordinary token-operated or coin-operated systems suffer from several disadvantages, including the labor and infra-structure required for collecting, counting and recycling the tokens or coins, and the danger of vandalism and theft.

For this reason, a number of forms of value cards have been devised, which value cards include heat-sensitive optically-readable elements each representing a unit of value for the respective goods or services being vended. The optically-readable value element is usually in the form of a thermographic deposit which is heated to effect the cancellation of the element after the respective item has been vended. Each window in such a card includes a heat-sensitive material whose transparency changes upon heating. These changes in transparency may be either reversible (thermochromic), or irreversible (thermographic). The above-cited patent specification discloses such a value card wherein each window is comprised of a material which when heated to a particular temperature above ambient, undergoes a first change which is reversible, and when heated to a higher temperature, undergoes a second transparency change which is irreversible. Thus, the reversible change may be used to check the validity of the value element, and the second change may be used to effect the cancellation of the value element.

A number of heat-sensitive materials, both thermographic and thermochromic, are known. Some of these materials become more transparent upon heating, and others become more opaque upon heating.

An object of the present invention is to provide a method and apparatus for coding heat-sensitive optically-readable media to permit the media to be used only for a specified application, and not to be used for other applications.

SUMMARY OF THE INVENTION

According to a broad aspect of the present invention, there is provided a method of coding an optically-readable medium, comprising: applying to the medium at least one coating of a heat-sensitive material to produce a specified combination of at least two optical changes as a function of time when heated to a predetermined temperature above ambient; heating the medium to the predetermined temperature; and sensing the optical changes undergone by the medium to determine whether the sensed changes match said specified combination.

According to another aspect of the invention, there is provided apparatus for coding, comprising: an optically-readable medium having at least one coating of a heat-sensitive material which produces a specified combination of at least two optical changes as a function of time when heated to a predetermined temperature above ambient; heating means for heating the medium to the predetermined temperature; and sensor means sensing the optical changes undergone by the medium when heated by the heating means to determined whether the sensed changes match the specified combination.

Preferably, the optical changes to be matched are transparency changes.

In the described preferred embodiments, the heat-sensitive coatings are in a plurality of windows formed in the medium, each window signifying a value element.

BRIEF DESCRIPTION OF THE DRAWINGS

The invention is herein described, by way of example only, with reference to the accompanying drawings and the specific examples described below. In the drawings:

FIGS. 2 and 3 are graphs illustrating the changes in transparency as a function of time when the medium of FIGS. 1 and 1a is constructed according to two described examples and is heated to a predetermined temperature above ambient;

FIG. 4 schematically illustrates a three-layer medium in accordance with the present invention;

FIGS. 5 and 6 are graphs illustrating the changes in transparency as a function of time according to two described examples of the three-layer medium of FIG. 4; and FIG. 7 illustrates the portion of the control circuit of FIG. 1 which effects the comparison of the electrical signals from the light transducer with stored data representing the specified combination of changes to determine whether there is a match between them.

DESCRIPTION OF PREFERRED EMBODIMENTS

Figure 1:
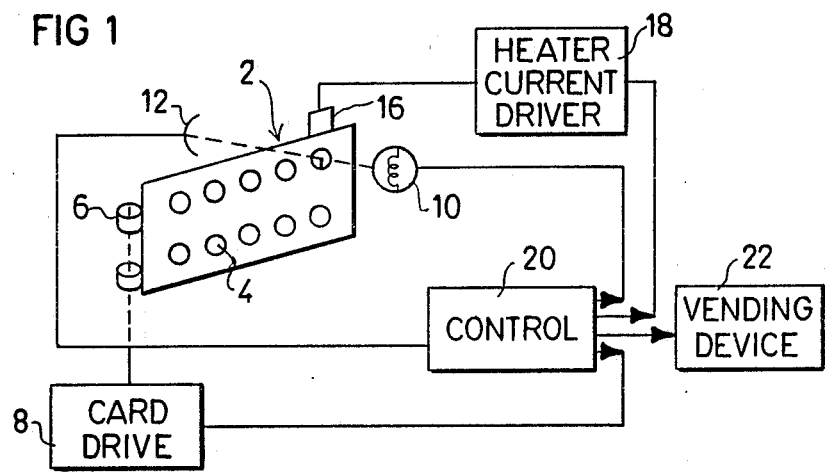
FIG. 1 schematically illustrates a heat-sensitive optically-readable medium in accordance with the present invention, and the system in which such medium is used.

With reference first to FIG. 1, there is shown a value card, generally designated 2, formed with a plurality of heat-sensitive, optically-readable windows or apertures 4 each representing a value element. Card 2 is used with equipment which includes a pair of feeding wheels 6 driven by a card drive 8 for feeding the card into an examination station in apparatus. At the examination station are located a light source 10 at the front side of the card, and a light transducer 12 at the back side of the card for detecting transmitted light. The illustrated system further includes a heating element 16 supplied by a heating current driver 18. All the foregoing elements are controlled by a control unit 20, which unit also controls a vending device 22.

Figure 1A:
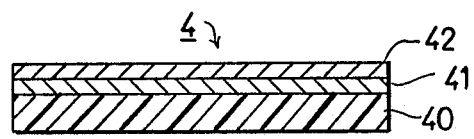
FIG. 1a is a sectional view illustrating the various layers in the optically-readable medium of FIG. 1.

FIG. 1a illustrates the construction of card 2 at one of the heat-sensitive, optically-readable windows 4. The card at each window 4 includes the substrate 40 (which is of the material of the card such as cardboard, paper or plastic); a first heat-sensitive coating 41 over substrate 40; and a second heat-sensitive coating 42 over coating 41. By using different combinations of heat-sensitive coatings 41 and 42, there can be produced a temporal pattern of transparency changes or other optical changes, at the respective windows 4 when the windows are heated to a predetermined temperature above ambient by heating element 16.

Preferably, heat-sensitive coating 41 is one of the known thermographic materials, i.e., materials producing an irreversible temperature change when heated to a predetermined temperature above ambient. Many such materials are known, for example, as described in U.S. Pat. Nos. 2,912,377; 2,663,654; 3,031,329; and 3,682,684, and are commercially available. A preferred material for coating 41 is one including a noble metal salt such as silver behenate, and an organic reducing agent such as methyl gallate. When this material is subjected to a high temperature above ambient, an oxidation-reduction reaction is heat-induced, resulting in the liberation of the free metal, which produces a distinct visible change at the heated area.

In the preferred embodiment of the invention described below, coating 41 includes a plastic binder of polyvinyl acetate or cellulose acetate.

Following are two examples of the materials which can be used for constructing a two coating window as illustrated in FIG. 1a:

EXAMPLE 1

In this example, coating 41 is of the thermographic material described above, including silver behenate, methyl gallate and plastic binder Coating 42 over the thermographic coating 41 is copper-mercury-iodide ($Cu_2HgI_4$) pigment; this material is red at ambient temperatures, temporarily (i.e. reversibly) turns black at about 70° C., permanently (i.e., irreversibly) turns opaque white upon decomposition at about 200° C. Following is an example of the formulation of this coating 42:

95 gm $Cu_2HgI_4$
101 gm poster base lacquer (Sera-Screen Long Island City, N.Y.)
71 gm T-31-228 lacquer (Ariol-Haifa, Israel)
33 gm Shell solvent AB This pigment was ground and mixed in a ball mill for 40 hours and printed by a silk-screen process through a 100 mesh polyester screen.

Figure 2:
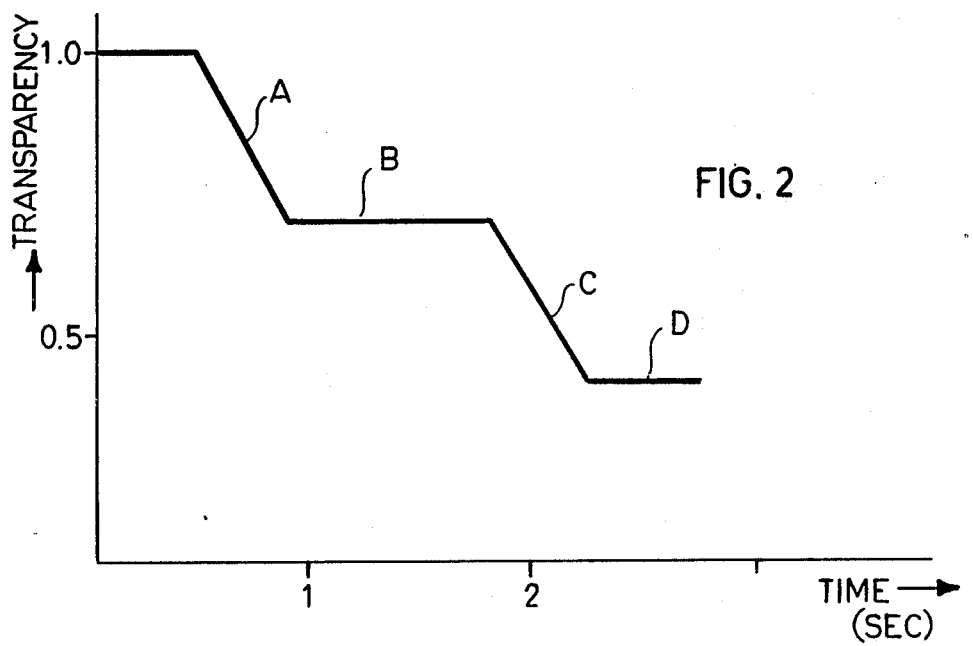

FIG. 2 illustrates the change in relative transparency of window 4 (FIG. 1a) when the window was heated to a temperature of 120° C. It is believed that the transparency pattern changes exhibited by the window as a function of time may be explained as follows: (a) there was an initial decrease in transparency (A) due to the reversible change in crystal structure of the $Cu_2HgI_4$ at 70° C.; (b) this was followed by a plateau of transparency (B) during which the applied heat melted the plastic binder of the thermographic coating 41; (c) a final irreversible change in transparency took place caused by the heat-induced oxidation-reduction reaction of the silver behenate and methyl gallate acid in coating 41 (C, D).

EXAMPLE 2

This example is also of a two-coating window according to the construction illustrated in FIG. 1a. Coating 41 in this example is the same as in Example 1 above. Coating 42, however, includes a behenic acid pigment composed as follows:

50 gm behenic acid
100 ml shell solvent AB
46 gm Silchrone base (Tessicolor ilana, Italy)

This pigment was mixed in a ball mill and applied in the same manner as the pigment in Example 1.

FIG. 3 illustrates the changes in relative transparency with time when window 4 constructed in accordance with this example was heated to a temperature of 120° C. It is believed that the temporal pattern of transparency changes undergone by this example can be explained as follows: (a) the behenic acid film 42 became more transparent (E) when it reached its fusion temperature of 83° C.; (b) further heating produced a plateau of transparency (F) as a result of the fusion of the plastic binder in coating 41; (c) further heating produced an irreversible decrease in transparency as a result of the heat-induced oxidation-reduction reaction of the silver behenate and the methyl gallate agent in coating 41.

EXAMPLE 3

This Example 3 illustrates a construction of a window, generally designated 104 in FIG. 4, including a substrate 140, and three heat-sensitive coatings, 141, 142 and 143, respectively. Coating 141 is the same as coating 41 described above in Examples 1 and 2; coating 142 is of the $Cu_2HgI_4$ pigment as described above in Example 1 for coating 42; and coating 143 is of the same behenic acid pigment coating as described above in Example 2 for coating 42.

FIG. 5 illustrates the pattern of transparency changes in a window constructed in accordance with the foregoing Example 3 when the window is heated to a temperature 120° C. It will be seen that the transparency changes closely follow those in Example 2 as illustrated in FIG. 3, except that a small plateau of transparency (J) is experienced during the initial increase in transparency (I, K); this plateau (J) is probably due to the effects of the $Cu_2HgI_4$ coating underlying the behenic acid coating 143. The remainder of the pattern, including the large plateau of transparency (L) and the irreversible decrease in transparency (M, N) was found to be the same as in Example 2 as illustrated in FIG. 3.

EXAMPLE 4

This example also includes the three layers 141, 142 and 143, as illustrated in FIG. 4, with the same compositions for each of the layers as described in Example 4, except that the behenic acid pigment layer 143 was diluted by an additional 20% by weight of solvent (Shell Solvent AB). In this case, it was found that the windows exhibited the changes in transparency, as a function of time, illustrated in FIG. 6, wherein there was an increase in transparency (O) as shown in FIG. 3, but with a shorter plateau of transparency (B), followed by an irreversible decrease in transparency (Q); this was followed by another plateau of transparency (R) before a further decrease in transparency (S, T) was experienced.

FIG. 7 illustrates the portion of the circuit within control circuit 20 of FIG. 1 which senses whether the changes in transparency sensed by the light detector 12 correspond to the specified combination to determine that a valid match exists. As shown by the circuit illustrated in FIG. 7, the electrical signals from the light transducer 12 (FIG. 1) are fed to a differentiating amplifier 50 which outputs an electrical signal corresponding to the time derivative of its input signal. The latter signal is further processed by a clipping and threshold amplifier 52, including a pair of threshold Zener diodes 54, 56 at the input end of the amplifier, and a pair of clipping Zener diodes 58, 60 across the amplifier. The output of amplifier 52 consists of a series of pulses representing "1", "0" and "−1". This output is fed to a comparator 62 and is compared with data stored in a storage device 64 representing the specified combination of optical changes for a valid match. A timer 66 provides clock pulses at specified intervals to comparator 62 to specify the times at which the comparisons are made.

The output signal from comparator 62 thus indicates whether or not a valid match has occurred. This output signal may be transmitted, for example, to the vending device 22 to enable the operation of that device only if a valid match has been detected.

It will be appreciated that in all the above examples, there was first experienced a stepwise change in transparency (a decrease in FIG. 2, and an increase in FIGS. 3, 5 and 6) probably due to physical changes in the outer coating (42, 142), which change in transparency was followed by an irreversible decrease in transparency due to the heat-induced oxidation-reduction reaction of the silver behenate with the reducing agent in the inner layer (41, 141).

For some applications, such as access control, it may be desirable to have the full pattern of transparency change be reversible. In such a case, there would be used only thermochromic (reversible) materials for all the heat-sensitive layers; that is, none of the layers would include a thermographic (irreversible) material such as in layer 41 of FIG. 1a, or 141 in FIG. 4.

The heat-sensitive media described above may thus be used for coding various types of optically-readable media for different applications. When so used, the control circuit (20, FIG. 1, or FIG. 7) would be specially programmed for each application, and cards valid for one application would not be valid for other applications.

What is claimed is:

1. A method of coding an optically-readable medium comprising:
   applying to the medium at least one coating of a heat-sensitive material to produce a specified combination of at least two optical changes as a function of time when heated to a predetermined temperature above ambient;
   heating said medium to said predetermined temperature;
   and sensing the optical changes undergone by the medium to determine whether the sensed changes match said specified combination.

2. The method according to claim 1, wherein said heat-sensitive coating is in a plurality of windows formed in said medium, each window signifying a value element.

3. The method according to claim 1, wherein at least two coatings of different heat-sensitive materials are applied to said optically-readable medium to produce said specific combination of at least two optical changes as a function of time.

4. Apparatus for coding, comprising:
   an optically-readable medium having at least one coating of a heat-sensitive material which produces a specified combination of at least two optical changes as a function of time when heated to a predetermined temperature above ambient;
   heating means for heating said medium to said predetermined temperature; and
   sensor means sensing the optical changes undergone by the medium when heated by said heating means to determined whether the sensed changes match said specified combination.

5. The apparatus according to claim 4, wherein said sensor means comprises:
   a light transducer producing electrical signals in accordance with the optical changes undergone by said medium when heated to said predetermined temperature;
   a storage device storing data representing said specified combination of changes; and
   a comparator comparing the electrical signals from the transducer with the data stored in said storage device.

6. The apparatus according to claim 5, wherein said sensor means further comprises a differential amplifier receiving the electrical signals from said light transducer and feeding same to said comparator.

7. The apparatus according to claim 4, wherein said optically-readable medium comprise a substrate and at least two coatings of heat-sensitive materials which produce a predetermined combination of at least two optical changes as a function of time when heated to a predetermined temperature above ambient.

8. The apparatus according to claim 7, wherein the outer one of said two coatings is a thermochromic material producing a reversible optical change when heated to a first temperature, and the inner one of said two coatings is a thermographic material producing an irreversible optical change when heated to a second temperature higher than said first temperature.

9. The apparatus according to claim 8, wherein there are two different thermochromic coatings over said thermographic coating.

10. The apparatus according to claim 4, wherein said heat-sensitive coatings are in a plurality of windows formed in said medium, each window signifying a value element.

11. Apparatus for coding, comprising:
    an optically-readable medium having a plurality of windows each signifying a value element;
    each of said windows including at least one coating of a heat-sensitive material which produces a specified combination of at least two optical changes as a function of time when heated to a predetermined temperature above ambient;
    heating means for heating said medium to said predetermined temperature; and
    sensor means sensing the optical changes undergone by the medium when heated by said heating means to determined whether the sensed changes match said specified combination.

12. The apparatus according to claim 11, wherein said sensor means comprises:
    a light transducer producing electrical signals in accordance with the optical changes undergone by said medium when heated to said predetermined temperature;
    a storage device storing data representing said specified combination of changes; and
    a comparator comparing the electrical signals from the transducer with the data stored in said storage device.

13. The apparatus according to claim 12, wherein said sensor means further comprises a differential amplifier receiving the electrical signals from said light transducer and feeding same to said comparator.

14. The apparatus according to claim 11, wherein said optically-readable medium comprise a substrate and at least two coatings of heat-sensitive materials at each of said windows, which coatings produce a predetermined combination of at least two optical changes as a function of time when heated to a predetermined temperature above ambient.

15. The apparatus according to claim 14, wherein the outer one of said two coatings is a thermochromic material producing a reversible optical change when heated to a first temperature, and the inner one of said two coatings is a thermographic material producing an irreversible optical change when heated to a second temperature higher than said first temperature.

16. The apparatus according to claim 15, wherein there are two different thermochromic coatings over said thermographic coating.

17. An optically readable card comprising:
a substrate;
a first heat sensitive coating disposed above said substrate, said first heat sensitive substrate having irreversibly changed optical characteristics when heated to a first predetermined temperature above ambient; and
a second heat sensitive coating disposed above said substrate, said second heat sensitive substrate having a reversibly changed optical characteristic when heated to a second predetermined temperature above ambient.

18. An optically readable card, comprising:
support medium; and
a plurality of optically readable windows disposed on said support medium and each window signifying a value element, wherein each window comprises;
a substrate;
a first heat sensitive coating disposed above said substrate, said first heat sensitive substrate having irreversibly changed optical characteristics when heated to a first predetermined temperature above ambient; and
a second heat sensitive coating disposed above said substrate, said second heat sensitive substrate having a reversibly changed optical characteristic when heated to a second predetermined temperature above ambient.

19. The card of claim 17 wherein said second heat sensitive coating has an irreversibly changed optical characteristic when heated to a third predetermined temperature above ambient wherein said first predetermined temperature is less than said third predetermined temperature and is greater than said second predetermined temperature.

20. The card of claim 19 wherein said first heat sensitive coating is disposed between said substrate and said second heat sensitive coating.

21. A method of analyzing an optically readable card wherein the card includes a plurality of windows each including a first and second heat sensitive coating, comprising the steps of
exposing a window of said card to light;
heating said window to a predetermined temperature over a predetermined time period;
detecting light transmitted through said window when it is exposed to light; and
analyzing the light detected to determine changes in transparency characteristics of said window over aid predetermined time.

22. The method of claim 21 further comprising the steps of:
comparing the determined changes in transparency characteristics with a stored code;
producing a first output if said determined changes match said stored code; and
producing a second output if said changes do not match said stored code.

23. The method of claim 22 wherein said window has at least two distinct transparency values at which the transparency characteristic remains substantially constant for a finite time period during said first predetermined period of time.

24. The method of claim 21 wherein said transparency characteristic of said window varies in accordance with a temperature-time characteristic of said first heat sensitive coating and a temperature-time characteristic of said second heat sensitive coating.

* * * * *

UNITED STATES PATENT AND TRADEMARK OFFICE
CERTIFICATE OF CORRECTION

PATENT NO. : 4,958,065
DATED : September 18, 1990
INVENTOR(S) : Zvi Weinberger

It is certified that error appears in the above-identified patent and that said Letters Patent is hereby corrected as shown below:

Column 2, line 14, change "determined" to --determine--.

Column 3, line 34, change "binder" to --binder.--.

Column 3, line 38, change "C., permanently" to --C., and permanently--.

Column 3, line 40, change "200°" to --220°--.

Column 6, line 7, change "determined" to --determine--.

Column 6, line 25, change "comprise" to --comprises--.

Column 6, line 56, change "determined" to --determine--.

Column 7, line 6, change "comprise" to --comprises--.

Column 8, line 27, change "aid" to --said--.

Signed and Sealed this

Seventeenth Day of March, 1992

Attest:

HARRY F. MANBECK, JR.

*Attesting Officer*      *Commissioner of Patents and Trademarks*